United States Patent
Foulkes et al.

(10) Patent No.: US 11,130,555 B1
(45) Date of Patent: Sep. 28, 2021

(54) SERVICE DOOR FOR COWLS ON OUTBOARD MARINE PROPULSION DEVICES

(71) Applicant: Brunswick Corporation, Mettawa, IL (US)

(72) Inventors: David M. Foulkes, Mequon, WI (US); Steven J. Amerling, Fond du Lac, WI (US); Evan N. Kobman, Brandon, WI (US); Bradley R. Stafford, Omro, WI (US)

(73) Assignee: Brunswick Corporation, Mettawa, IL (US)

( * ) Notice: Subject to any disclaimer, the term of this patent is extended or adjusted under 35 U.S.C. 154(b) by 872 days.

(21) Appl. No.: 15/893,933

(22) Filed: Feb. 12, 2018

(51) Int. Cl.
 *B63H 20/32* (2006.01)
 *B63H 5/125* (2006.01)
 *B63H 20/08* (2006.01)
 *B63H 20/36* (2006.01)

(52) U.S. Cl.
 CPC .............. *B63H 20/32* (2013.01); *B63H 5/125* (2013.01); *B63H 20/08* (2013.01); *B63H 20/36* (2013.01); *Y10T 403/32614* (2015.01); *Y10T 403/32827* (2015.01)

(58) Field of Classification Search
 CPC .... B60K 2015/0538; B60K 2015/0561; B60K 2015/0569; B60K 2015/0576; E05B 73/0076; B63H 20/32; Y10T 403/32614; Y10T 403/32827
 See application file for complete search history.

(56) References Cited

U.S. PATENT DOCUMENTS

| 4,348,194 | A |   | 9/1982  | Walsh |              |
|-----------|---|---|---------|-------|--------------|
| 4,600,396 | A | * | 7/1986  | Crane | F02B 61/045  |
|           |   |   |         |       | 292/247      |
| 5,467,504 | A | * | 11/1995 | Yang  | E05D 11/084  |
|           |   |   |         |       | 16/342       |
| 6,101,676 | A | * | 8/2000  | Wahl  | E05D 11/082  |
|           |   |   |         |       | 16/340       |
| 6,702,357 | B2|   | 3/2004  | Joerg et al. |       |

(Continued)

FOREIGN PATENT DOCUMENTS

DE 20305291 7/2003

OTHER PUBLICATIONS

Unpublished U.S. Appl. No. 14/721,106, filed May 26, 2015.

*Primary Examiner* — Michael P Ferguson
(74) *Attorney, Agent, or Firm* — Andrus Intellectual Property Law, LLP

(57) ABSTRACT

A service door for a cowl for an outboard marine propulsion device that includes a door panel that is positionable in an open position and in a closed position. A first hinge rotatably couples the door panel to the cowl. A biasing device operates in conjunction with the first hinge and biases the door panel towards the open position. A second hinge rotatably couples the door panel to the cowl and at least one of the first hinge and the second hinge provides only one shear of rotation between the door panel and the cowl. A damper operates in conjunction with the second hinge and resists rotation of the door panel towards the open position. The inside of the cowl is accessible when the door panel is in the open position and inaccessible when the door panel is in the closed position.

14 Claims, 7 Drawing Sheets

(56) References Cited

U.S. PATENT DOCUMENTS

| | | | |
|---|---|---|---|
| 6,752,448 B1* | 6/2004 | Hsu | B60K 15/05 220/86.2 |
| 7,100,239 B2* | 9/2006 | Duan | G06F 1/1616 16/303 |
| 7,380,861 B2* | 6/2008 | Engel | B60K 15/05 296/97.22 |
| 7,517,169 B2* | 4/2009 | Dalum | F16M 11/10 248/139 |
| 7,566,089 B2 | 7/2009 | Alfaro | |
| 9,341,008 B1* | 5/2016 | Amerling | B63H 20/32 |
| 9,580,947 B1 | 2/2017 | Amerling et al. | |
| 2005/0280276 A1 | 12/2005 | McComsey | |

* cited by examiner

SERVICE DOOR FOR COWLS ON OUTBOARD MARINE PROPULSION DEVICES

FIELD

The present disclosure relates to outboard marine propulsion devices and more particularly to cowls and service doors for cowls on outboard marine engines.

BACKGROUND

U.S. patent application Ser. No. 14/721,106 is hereby incorporated by reference in entirety and discloses a latching apparatus for a cowl on an outboard marine engine. The cowl has a first cowl portion and a second cowl portion, which are latched together by the latching apparatus in a closed cowl position and unlatched from each other in an open cowl position. The latching apparatus comprises a retainer on the first cowl portion; an actuator device on the second cowl portion; and a wire coupled to the actuator device. The wire is coupled to the retainer in the closed cowl position and the wire is uncoupled from the retainer in the open cowl position. Actuation of the actuator device in a first direction rotates the wire so as to couple the wire to the retainer and actuation of the actuator device in a second direction rotates the wire so as to uncouple the wire from the retainer.

U.S. Pat. No. 4,348,194 is hereby incorporated herein by reference in entirety and discloses a cowl for the power head of an outboard motor that includes two bottom cowl members attached together by screws which also mount a latch bracket and a hinge member. The latch bracket supports a latch mechanism which, with the hinge member serves to hold a top cowl member in place.

U.S. Pat. No. 9,580,947 is hereby incorporated herein by reference in entirety and discloses a cowl for an outboard marine propulsion device having an internal combustion engine. The cowl comprises a first cowl portion; a second cowl portion that mates with the first cowl portion to enclose the internal combustion engine; a service door on the second cowl portion, wherein the service door is positionable in an open position and in a closed position; and a carrying handle on the second cowl portion, wherein the carrying handle is accessible when the service door is in the open position and inaccessible when the service door is in the closed position. A plurality of latches are spaced apart around the perimeter. The latches latch the second cowl portion to the first cowl portion. An actuator assembly actuates each of the plurality of latches. The actuator assembly can be actuated by movement of the carrying handle.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, a service door for a cowl for an outboard marine propulsion device includes a door panel that is positionable in an open position and in a closed position. A first hinge rotatably couples the door panel to the cowl. A biasing device operates in conjunction with the first hinge and biases the door panel towards the open position. A second hinge rotatably couples the door panel to the cowl, where at least one of the first hinge and the second hinge provides only one shear of rotation between the door panel and the cowl. A damper operates in conjunction with the second hinge and resists rotation of the door panel towards the open position. The inside of the cowl is accessible when the door panel is in the open position and inaccessible when the door panel is in the closed position.

In another example, a service door for a cowl for an outboard marine propulsion device includes a door panel having an edge with a first end and a second end that is opposite the first end. The door panel is positionable in an open position and in a closed position. A door backer is coupled to the door panel. A first hinge rotatably couples the first end of the door panel to the cowl, via the door backer, about a first axis. The first hinge comprises a first hinge base, a first hinge axle, and a first hinge axle opening in the door backer. The first hinge axle is coaxial with the first axis and is received in the first hinge axle opening. The first hinge axle has a base end and a distal end that is opposite the base end, where the base end is coupled to the first hinge base and the distal end has a spring slot. A coil spring is positioned between the door panel and the cowl and operates in conjunction with the first hinge to bias the door panel towards the open position. The coil spring has a fixed end and a rotating end that is opposite the fixed end. The rotating end is configured to impart a spring force on the door panel and the fixed end is in the spring slot in the first hinge axle. A second hinge rotatably couples the second end of the door panel to the cowl, via the door backer, about a second axis. The second hinge comprises a second hinge base, a second hinge axle, and a second hinge axle opening in the door backer, where the second hinge axle is coaxial with the second axis. The second hinge axle opening receives the second hinge axle. The second hinge axle has a base end and a distal end that is opposite the base end, where the base end is coupled to the second hinge base and the distal end defines a damper pin opening that is perpendicular to the second hinge axle. The first hinge and the second hinge are rotatable about separate but coaxial axes and each has only one shear of rotation between the door panel and the cowl. A damper is positioned between the door panel and the cowl and operates in conjunction with the second hinge to resists rotation of the door panel towards the open position. A damper disc defines a central opening and also defines a slot that is perpendicular to the central opening, wherein the central opening in the damper disc is configured to receive the second hinge axle. The damper has a fixed end that is configured to engage with the damper disc. The damper also has a rotating end that is opposite of the fixed end and is positioned closer to the base end than to the distal end of the second hinge axle. A damper pin is receivable in the damper pin opening to retain the damper and the damper disc on the second hinge axle. The inside of the cowl is accessible when the door panel is in the open position and inaccessible when the door panel is in the closed position.

A further example relates to a method for providing access inside a cowl for an outboard marine propulsion device. The method includes rotatably coupling a door panel to the cowl with a first hinge, where the door panel has an edge with a first end and a second end that is opposite the first end. The first hinge is coupled between the door panel and the cowl closer to the first end than to the second end and is positionable in an open position and in a closed position. The method includes rotatably coupling the door panel to the cowl with a second hinge, where the second hinge is coupled between the door panel and the cowl closer to the second end than to the first end. The first hinge and the second hinge are rotatable about separate but coaxial axes, each having only one shear of rotation between the door panel and the cowl. The method includes positioning a spring between the door panel and the cowl such that the spring biases the door panel towards the open position, where the spring is positioned closer to the first end than to the second end of the door panel. The method includes positioning a damper between the door panel and the cowl such that the damper resists rotation of the door panel towards the open position, where the damper is positioned closer to the second end than to the first end of the door panel. The inside of the cowl is accessible when the door panel is in the open position and inaccessible when the door panel is in the closed position.

BRIEF DESCRIPTION OF THE DRAWINGS

The present disclosure is described with reference to the following Figures. The same numbers are used throughout the figures to reference like features and like components.

DETAILED DESCRIPTION OF THE DRAWINGS

Figure 1:
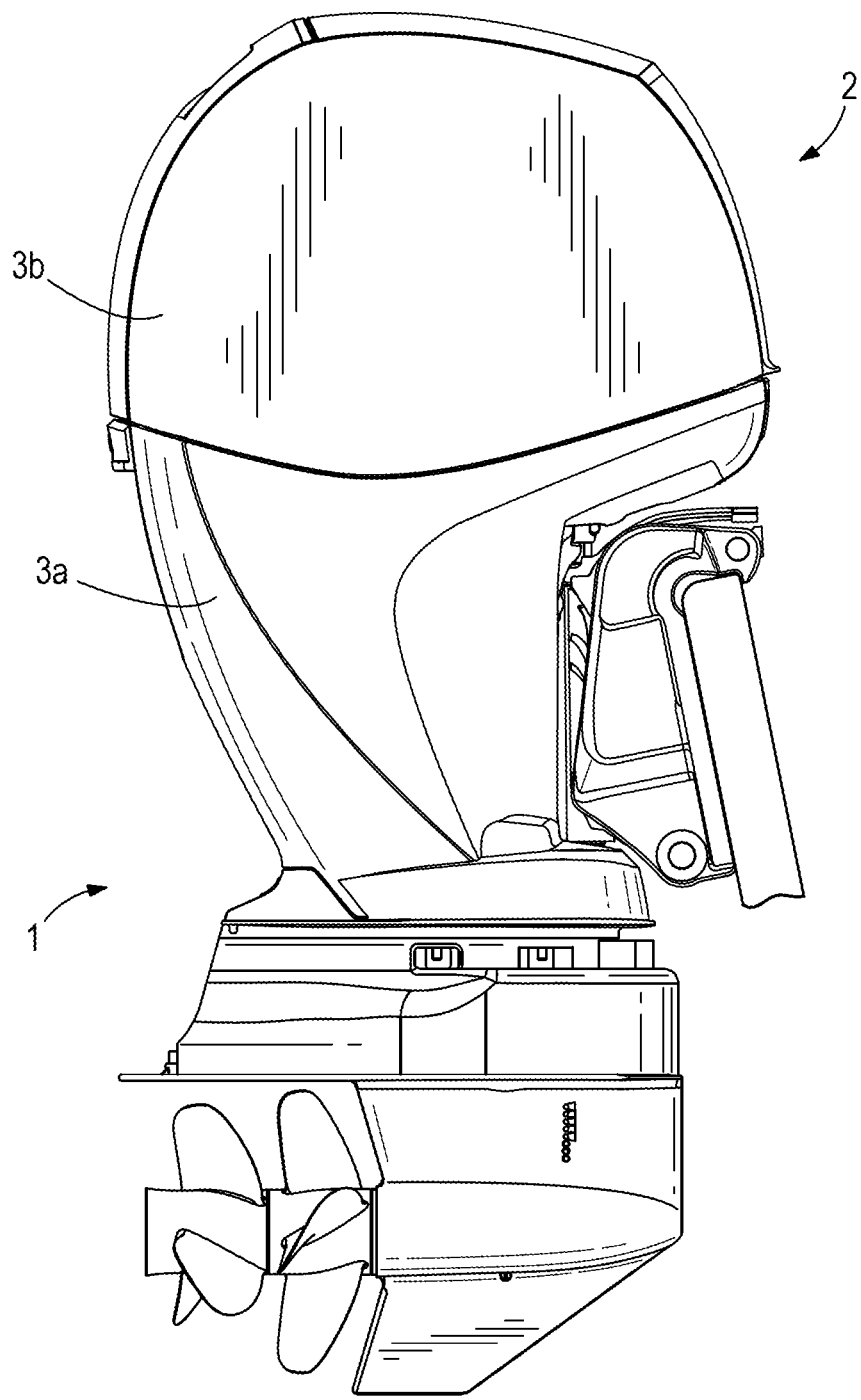
FIG. 1 is a side view of an outboard marine propulsion device with a cowl held in a closed cowl position.

FIG. 1 depicts a cowl 2 on an outboard marine propulsion device 1. The cowl 2 has lower and upper cowl portions 3a, 3b that are separated from each other in an open cowl position (not shown) and that are latched together by a latching system A in a closed cowl position (FIG. 2), such as that disclosed in U.S. Pat. No. 9,580,947. The type and configuration of the cowl 2 and outboard marine propulsion device 1 can vary from that which is shown in the figures. In the illustrated example, the upper cowl portion 3b is a top cowl and the lower cowl portion 3a is a lower cowl or "chaps." However cowl 2 could also be arranged so that the upper cowl portion 3b is the lower cowl and the lower cowl portion 3a is the top cowl, for example. The concepts of the present disclosure are applicable to other cowl configurations.

Additional details regarding the opening and closing of the cowl 2, as well as various latching systems A, handles B, and locking mechanisms 80 (FIG. 3) for the service door 10 are provided in U.S. Pat. No. 9,580,947.

Figure 2:
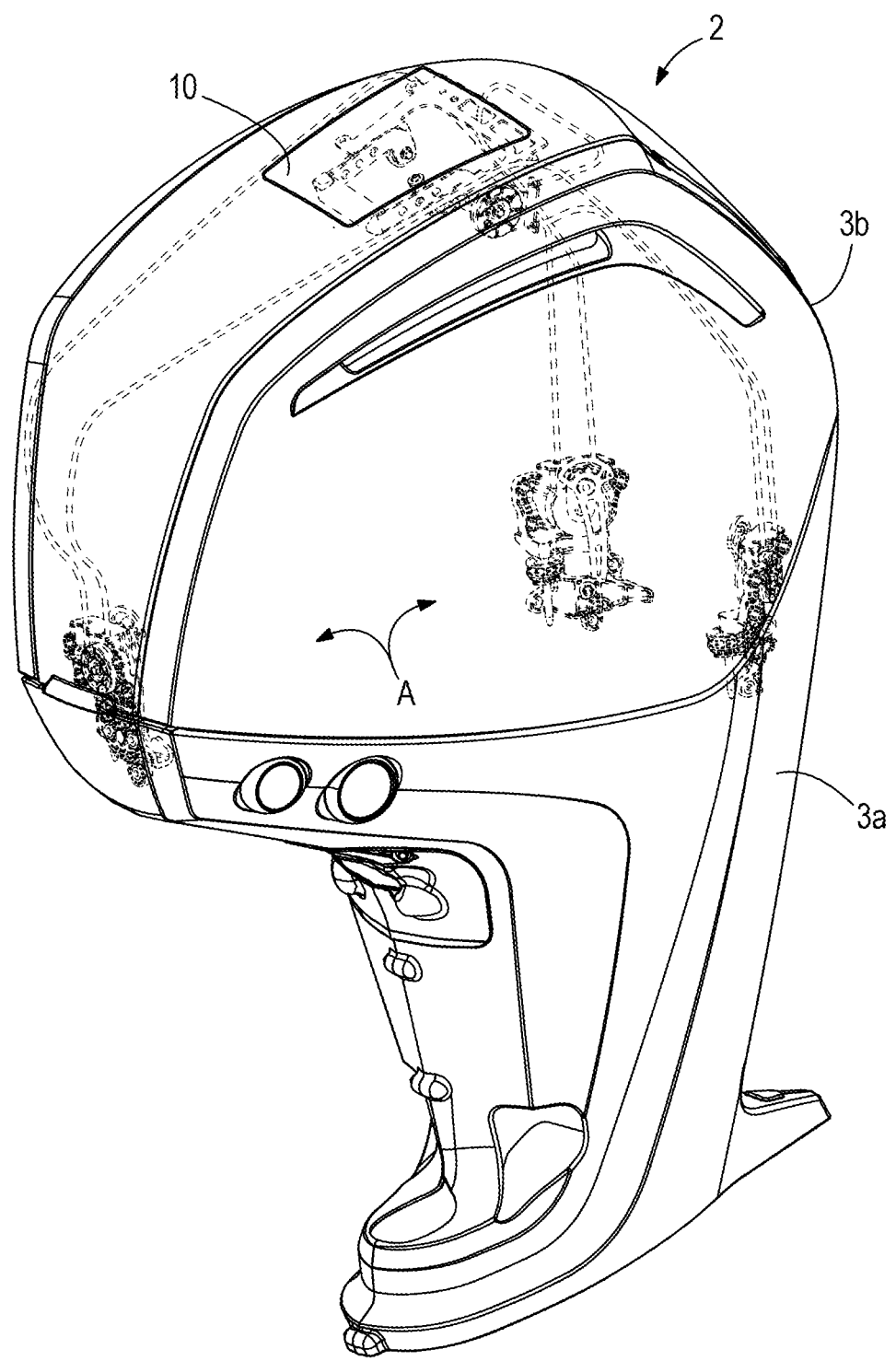
FIG. 2 is a perspective view of another example of a cowl for an outboard marine propulsion device held in a closed cowl position by a latching assembly shown in dashed lines, along with a service door shown in a closed position.
Figure 3:
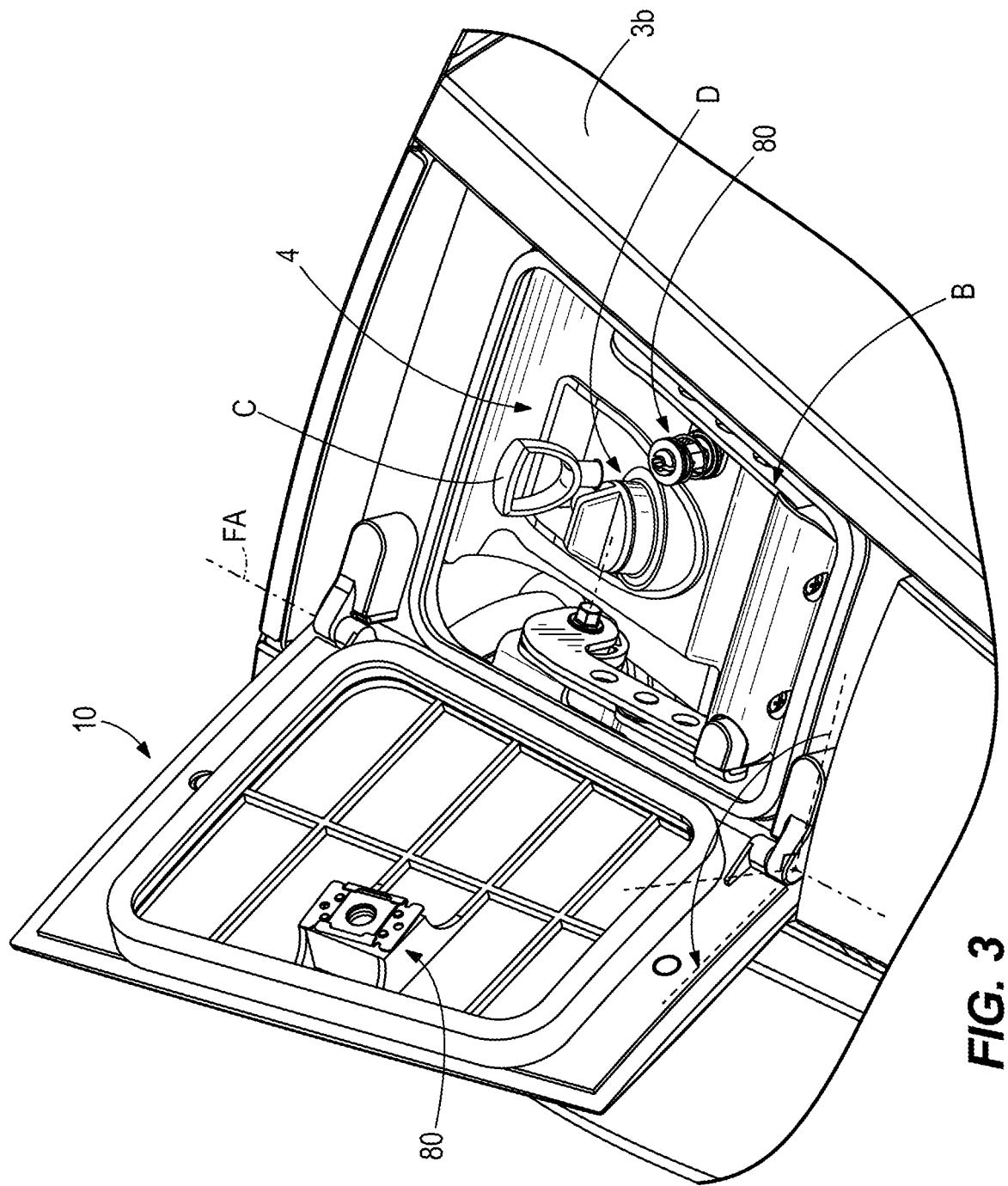
FIG. 3 is a perspective view of the service door shown in FIG. 2 in an open position.

FIGS. 2-3 depict an exemplary cowl 2 for an outboard marine propulsion device 1, along with a latching system A for the cowl 2. Similar to the embodiment shown in FIG. 1, the cowl 2 encloses an internal combustion engine (not shown). The cowl 2 has an upper cowl portion 3b and a lower cowl portion 3a that mates with the upper cowl portion 3b in a closed cowl position to enclose the noted internal combustion engine. A service door 10 on the upper cowl portion 3b is positionable in an open position (FIG. 3) and a closed position (FIG. 2). In some embodiments, a handle B for carrying the upper cowl portion 3b is provided. The handle B is accessible when the service door 10 is in the open position and inaccessible when the service door 10 is in the closed position. Opening the service door 10 provides access inside the cowl 2 through an opening 4 therein, such as to access the dipstick C or plug D for the oil system of the noted internal combustion engine.

A locking mechanism 80 locks the service door 10 in the closed position. In the illustrated example, the locking mechanism 80 is a spring-actuated latch mechanism configured such that pressing down on the service door 10 causes the locking mechanism 80 to lock the service door 10 in the closed position, and subsequently pressing on the service door 10 causes the locking mechanism 80 to unlock the service door 10 from the closed position. When unlocked, the service door 10 is free to pivot manually into the open position. This type of locking mechanism is conventional. Other suitable locking mechanisms, including other types of push-to-open, push-to-close locking mechanisms, could instead be employed.

However, through experimentation and development, the present inventors have identified that when push-to-open, push-to-close latching systems are incorporated in a service door 10, it can be difficult for the operator to visually discern whether the service door 10 is latched or unlatched (also referred to as being locked or unlocked, respectively). In a conventional arrangement, the open edge of a service door 10 moves only about 4 millimeters upwardly between the latched and unlatched positions, thereby being difficult to visually detect from a distance.

Moreover, the present inventors have identified that in addition to the act of pressing on the service door 10 to unlock from the latched position to the unlatched position, another, separate motion is required to actually open the service door 10. Specifically, the operator must separately grab the edge of the service door 10 and rotate it to the open position. As such, the present inventors have identified that it would be advantageous for a service door 10 to automatically open with a single, one-step motion that requires only a single push of the service door 10.

As will be discussed further below, the present disclosure relates to an automatic opening service door 10 that employs a biasing device 40 and a damper 60. In use, when the service door 10 is pressed to unlatch, the biasing device 40 is free to fully open the service door 10. Concurrently, the damper 60 controls the rate by which the service door 10 is opened by the biasing device 40, giving the door opening motion a refined look and reducing or eliminating the end-of-stroke rebound bounce of the service door 10 hitting the cowl 2 at the fully opened positioned. In certain embodiments, the biasing device 40 is a torsional coil spring and the damper 60 is a torsional damper. However, other types of devices would be known to one of ordinary skill in the art.

Figure 4:
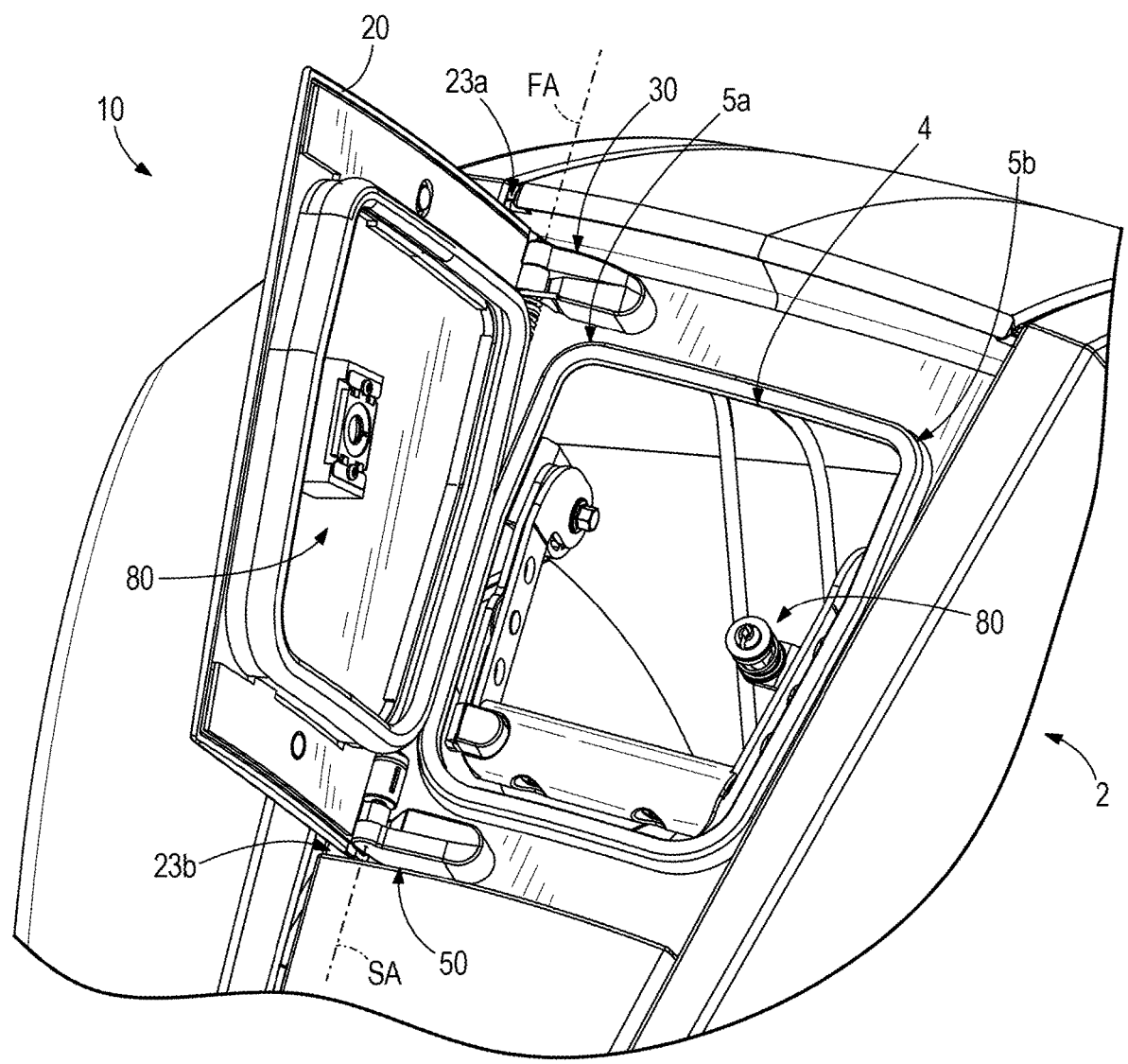
FIG. 4 is a perspective view of an embodiment of a service door, shown in an open position on the exterior of the cowl, according to the present disclosure.

FIG. 4 depicts one embodiment of a service door 10 in accordance with the present disclosure. The service door 10 depicted in FIG. 4 is similar to that shown in FIG. 3, which is described in detail in U.S. Pat. No. 9,580,947. However, the embodiment shown in FIG. 4 provides automatic opening of the service door 10, as well as a controlled rate of opening by the damper 60. Specifically, FIG. 4 depicts a service door 10 for a cowl 2 of an outboard marine propulsion device 1, such as that shown in FIG. 1. The service door 10 comprises a door panel 20 that is positionable in an open position, as well as a closed position. The door panel 20 is rotatably coupled to the cowl 2 with a first hinge 30 positioned substantially near a first end 23a of the door panel 20, and a second hinge 50 positioned substantially near a second end 23b of the door panel 20. As shown, the first hinge 30 is pivotable about a first axis FA and the second hinge 50 is pivotable about a second axis SA that is coaxially aligned with the first axis FA. The service door 10 can be latched and unlatched using the locking mechanism 80, as previously discussed. In this regard, the service door 10 provides access to an opening 4 within the cowl 2.

It should be recognized that reference to the service door 10 being opened or closed, and latched or unlatched, is synonymous with the stating the same for the door panel 20, unless otherwise provided. Likewise, where the service door 10 comprises a door backer 21 in addition to the door panel 20, the previously listed positional and/or latching states also apply to such a door backer 21.

Figure 5:
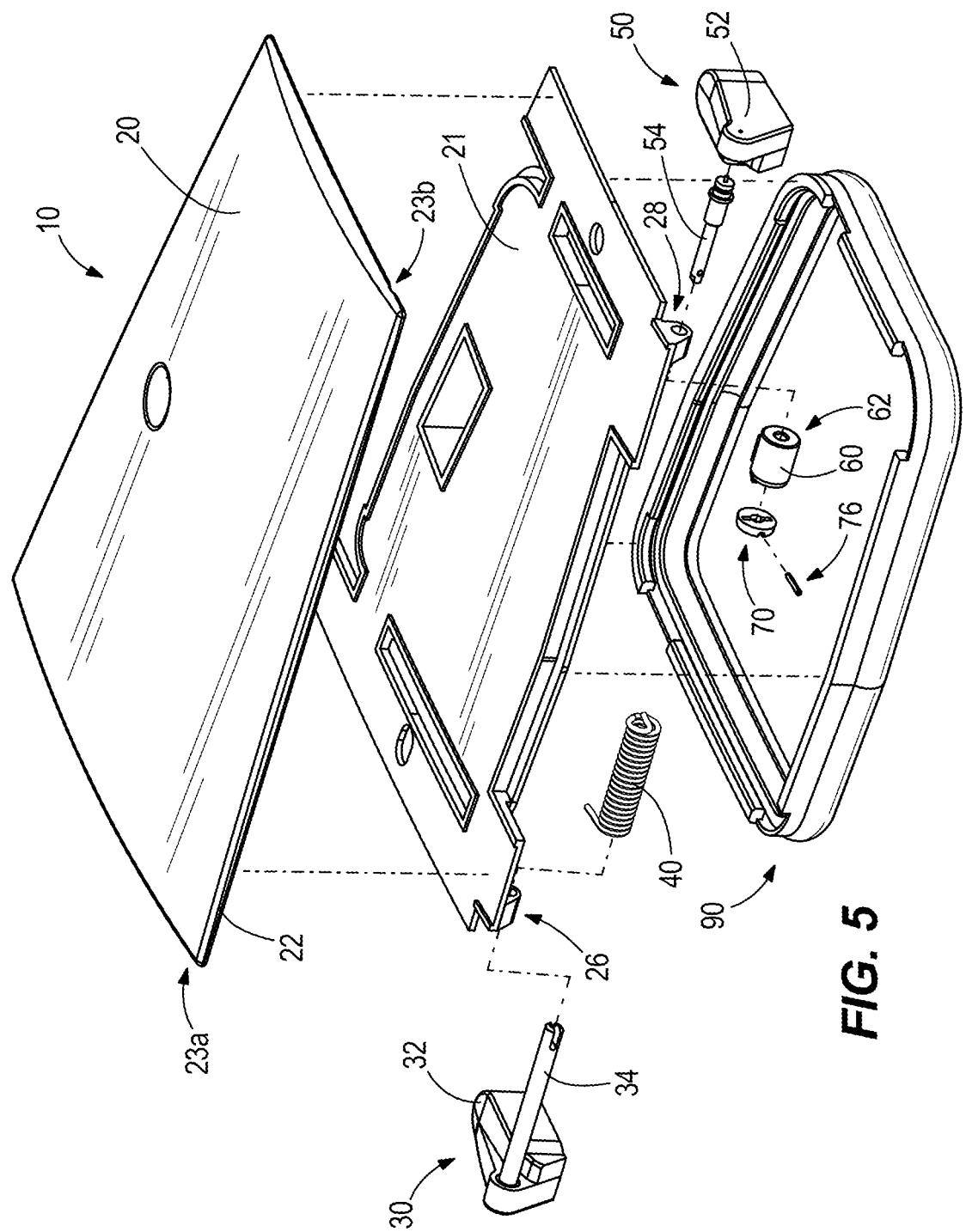
FIG. 5 is an exploded view of another embodiment of a service door similar to that shown in FIG. 4.

FIG. 5 depicts an exploded view of the service door 10 shown in FIG. 4. A biasing device 40 operates in conjunction with the first hinge 30 to bias the door panel 20 towards the open position. In the embodiment shown, the first hinge 30 includes a first hinge base 32 coupled to a first hinge axle 34, which at is receivable in a first hinge axle opening 26. In the embodiment shown, the first hinge axle opening 26 is defined within a door backer 21 that is coupled to the door panel 20. In certain embodiments, the door backer 21 defines the first hinge axle opening 26 instead of it being defined within the door panel 20 itself. In this manner, the first hinge axle 34 is coaxial with the first axis FA of rotation for the first hinge 30.

Similarly, a damper 60 operates in conjunction with the second hinge 50 to resist rotation of the door panel 20 as it is rotated towards the open position. In the embodiment shown, the second hinge 50 includes a second hinge base 52 coupled to a second hinge axle 54, which is received within a second hinge axle opening 28. In the embodiment shown, the second hinge axle opening 28 is defined within the door backer 21 in a similar manner to the first hinge axle opening 26, as opposed to being defined within the door panel 20 itself. As provided above, the second hinge axle opening 28 may also be defined within the door panel 20 itself, in conjunction with or instead of incorporating a door backer 21 within the service door 10. As shown, the second hinge 50 is rotatable about a second axis SA that is coaxial with the second hinge axle 54.

FIG. 5 further depicts the incorporation of a damper disc 70 and damper pin 76 that cooperate with the damper 60 for resisting rotation of the door panel 20 towards the open position, which is discussed further below. It should be recognized that the damper 60 may also be configured to resist rotation of the door panel 20 towards the closed position, including a different resistance rate compared to rotation towards the open position, depending on the particular type of damper 60 selected. In one embodiment, the damper 60 is Supplier Part No. 43001NAT-15 by GBK UK LIMITED, Lancashire, UK, which is available for purchase in the market. A gasket 90 is also shown, which is positioned between the door panel 20 and the cowl 2 to provide a seal therebetween when the door panel 20 is latched in the closed position. It should be recognized that other types of dampers are also anticipated by the present disclosure, including torsion springs, pneumatic cylinders, and other devices known in the art for resisting or dampening motion.

Figure 6:
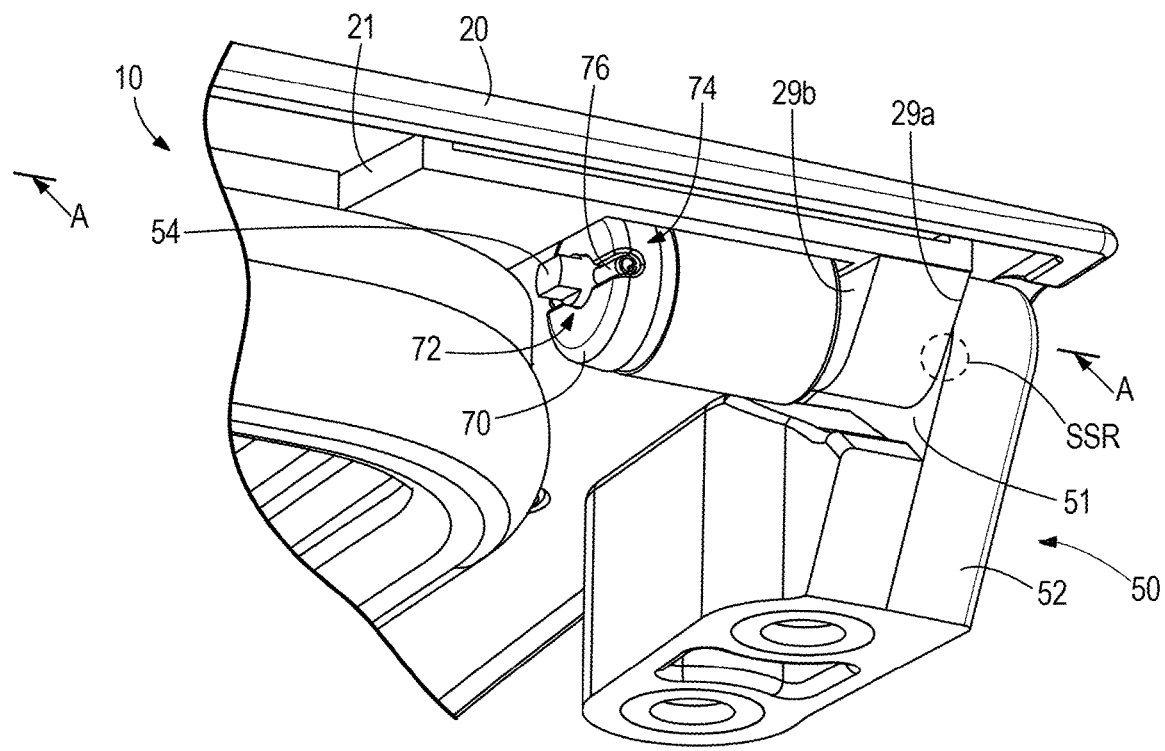
FIG. 6 is a perspective, lower cutaway view of the service door of FIG. 5 rotatably coupled to the cowl and incorporating a damper.
Figure 7:
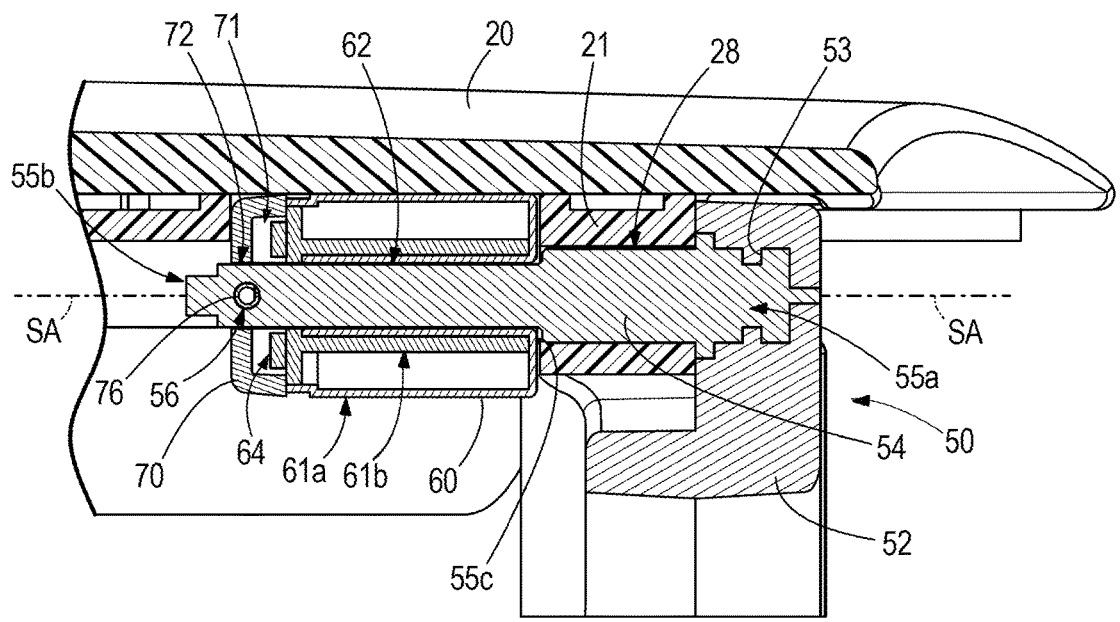
FIG. 7 is a view taken along the line A-A from FIG. 6.

FIGS. 6 and 7 further depict the second hinge 50 and the damper 60 incorporated in the service door 10. In particular, the second hinge 50 includes a second hinge base 52 coupled with a second hinge axle 54. The second hinge base 52 and second hinge axle 54 may be integrally formed, or be comprised of separate segments coupled together, such as through use of an adhesive in the anchor region 53. The second hinge axle 54 has a base end 55a that is coupled to the second hinge base 52, as well as a distal end 55b that is opposite the base end 55a. In the embodiment shown, the second hinge axle 54 extends from the second hinge base 52 in a cantilevered manner such that only one shear of rotation SSR exists between the door panel 20 and the cowl 2 with respect to the second hinge 50. Specifically, the one sheer of rotation SSR exists at the interface between a rotation face 51 on the second hinge base 52 and a base face 29a (which is opposite a distal face 29b) where the second hinge axle opening 28 is defined, here within the door backer 21. It should be recognized that one or both of the first hinge 30 and the second hinge 50 in certain embodiments have more than a one sheer of rotation, as with conventional hinges in the art.

FIGS. 6 and 7 further depict a damper 60 cooperating with the second hinge 50. The damper 60 is shown to be an annular cylinder having a central opening 62 that receives the second hinge axle 54. The damper 60 has a first member 61a and a second member 61b that are coaxially aligned and rotatable relative to each other. In the embodiment shown, the first member 61a is fixed to the door backer 21, such as by a fastener, welding, adhesives, or respective geometries configured to mate together in a non-rotatable manner, for example. In certain embodiments, the second hinge axle 54 narrows in diameter at a shelf 55c to prevent the first member 61a of the damper 60 from contacting or abutting the second hinge axle 54. The damper disc 70 is also receivable on the second hinge axle 54 through a central opening 72 in the damper disc 70. In certain embodiments, the damper disc 70 also includes a cavity 71 that engages tabs 64 on the second member 61b of the damper 60, which in certain embodiments prevents rotation between the second member 61b and the damper disc 70. In certain embodiments, the damper disc 70 further defines a slot 74 configured to receive the damper pin 76 to prevent further rotation between the damper disk 70 and the second hinge axle 54. In this manner, the damper 60 resists movement of the second hinge 50.

The second hinge axle 54 includes a base end 55a that is coupled to the second hinge base 52, as well as a distal end 55b that is opposite the base end 55a. The distal end 55b of the second hinge axle 54 defines a damper pin opening 56 that receives a damper pin 76 as shown in FIG. 7. The damper disc 70 and damper pin 76 cooperate to retain the damper 60 on the second hinge axle 54. In this manner, the damper 60, resists movement of the second hinge 50. In some embodiments, the damper is a fluid-based damper. However, other dampers are also known in the art.

Figure 8:
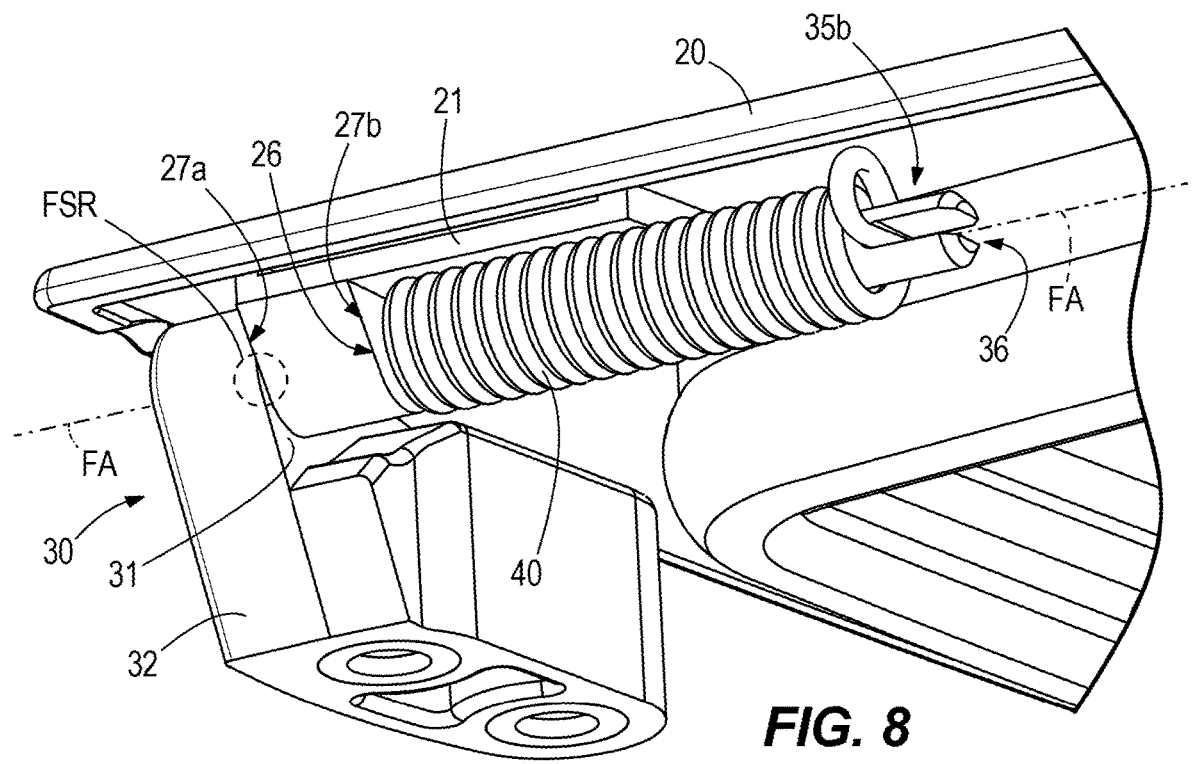
FIGS. 8-9 are perspective lower and upper cutaway views of the service door of FIG. 5 rotatably coupled to the cowl and incorporating a biasing device.
Figure 9:
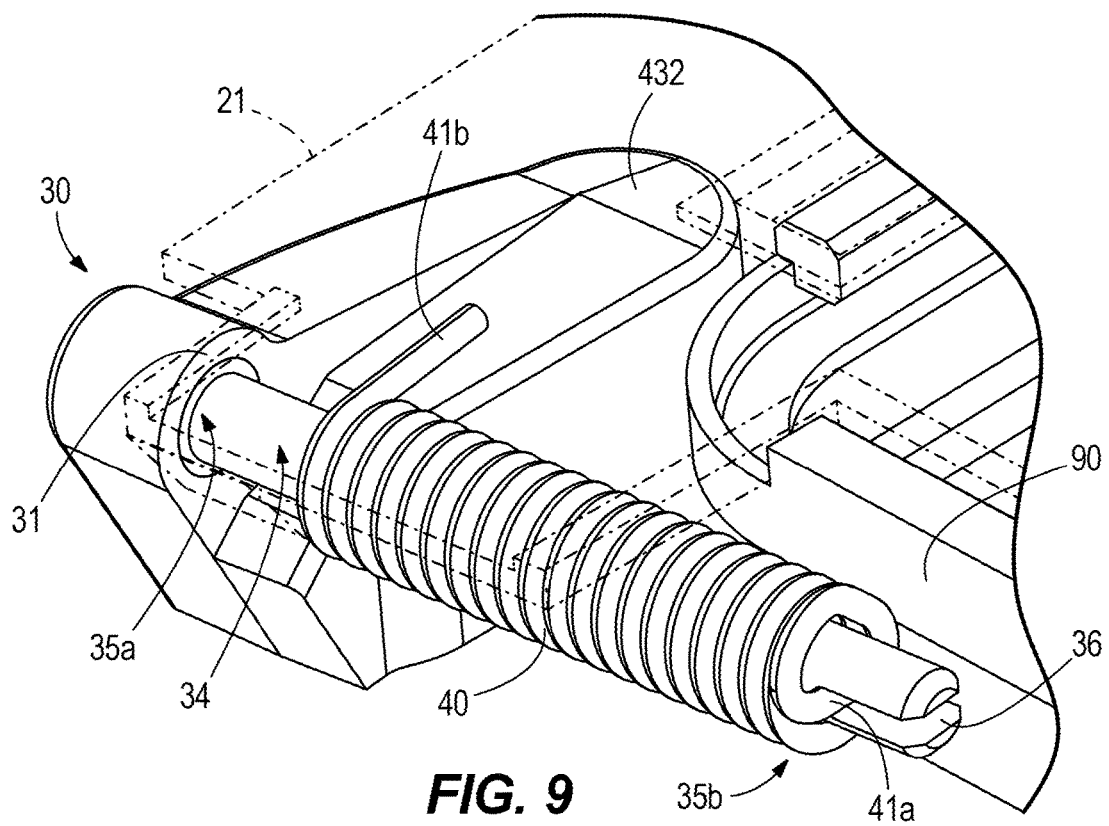

Similarly, FIGS. 8 and 9 depict one embodiment of the first hinge 30, specifically shown with a coil spring as the biasing device 40 incorporated therein. It will be recognized that other types of biasing devices 40 are also possible, including tension springs, flat springs, and pneumatic cylinders, for example. Similar to the second hinge 50, the first hinge 30 has a first hinge base 32 coupled with a first hinge axle 34. The first hinge axle 34 has a base end 35a that is coupled to the first hinge base 32, as well as a distal end 35b that is opposite the base end 35a. In the embodiment shown, a spring slot 36 is defined within the distal end 35b.

The biasing device 40 has a fixed end 41a and a rotating end 41b that is opposite the fixed end 41a. In the embodiment shown, the rotating end 41b is configured to impart a spring force on the door panel 20 via the door backer 21, while the fixed end 41a is received in the spring slot 36. In this manner, the biasing device 40 provides a torsional force to bias the door panel 20 towards the open position when the door panel 20 is unlocked. It should be recognized that in other embodiments, the fixed end 41a and rotating end 41b are not on opposing ends of the biasing device 40, including having two opposing fixed ends with a rotating end in the middle, for example. The fixed and rotating ends may also be switched while still performing the same function.

As with the second hinge 50, the first hinge 30 may be integrally formed, or the first hinge base 32 may be coupled to the first hinge axle 34 through adhesives, press-fit arrangements, or other coupling methods known in the art. Likewise, both the biasing device 40 and the damper 60 may be configured such that the fixed end 41a and the rotating end 41b, and/or the first member 61a and the second member 61b, may be switched, respectively.

As shown in FIGS. 8 and 9, the first hinge 30 is configured similarly to the second hinge 50 such that the first hinge axle 34 is coupled to the first hinge base 32 in a cantilevered manner, whereby only one shear of rotation FSR is provided between the door panel 20 and the cowl 2 with respect to the first hinge 30. Here, the one sheer of rotation FSR exists at the interface between a rotation face 31 on the first hinge base 32 and a base face 27a (which is opposite a distal face 27b) where the first hinge axle opening 26 is defined, here within the door backer 21. As previously discussed, two or more sheers of rotation for either or both of the first hinge 70 and the second hinge 50 are also anticipated by the present disclosure.

In the embodiment shown, both the biasing device 40 and the damper 60 are positioned between the door panel 20 and the cowl 2. However, one of ordinary skill in the art will recognize that other arrangements and configurations are also possible. Likewise, while the door panel 20 is shown to pivot open at an edge 22 that is shown to be on the left side of the door panel 20, the present disclosure also anticipates service doors 10 that open by pivoting on a right edge, top edge, bottom edge, or combinations thereof. Furthermore, while the edge 22 of the door panel 20 is shown to be substantially parallel to the left edge 5a of the opening 4 in the cowl 2, the edge 22 and the left edge 5a need not be parallel in all configurations.

The present disclosure thus provides a service door 10 for a cowl 2 that provides for automatic opening, with dampering, when the service door 10 is unlocked. In certain embodiments, each hinge that rotatably couples the service door 10 to the cowl 2 provides only a single shear of rotation between the door panel 20 and the cowl 2.

Another aspect of the present disclosure relates to a method for providing access inside a cowl 2 for an outboard marine propulsion device 1. The method includes rotatably coupling a door panel 20 to the cowl 2 with a first hinge 30, the door panel 20 having an edge 22 with a first end 23a and a second end 23b that is opposite the first end 23a. In certain embodiments, the method includes coupling the first hinge 30 between the door panel 20 and the cowl 2 closer to the first end 23a than to the second end 23b. The door panel 20 is positionable in an open position and in a closed position, as discussed above.

The method further includes rotatably coupling the door panel 20 to the cowl 2 with a second hinge 50. In certain embodiments, the second hinge 50 is coupled between the door panel 20 and the cowl 2 closer to the second end 23b than to the first end 23a of the edge 22. In certain embodiments, the first hinge 30 and the second hinge 50 are rotatable about separate but coaxial axes FA, SA, and the first hinge 30 and the second hinge 50 each have only one shear of rotation FSR, SSR between the door panel 20 and the cowl 2.

The method further includes positioning a biasing device 40 between the door panel 20 and the cowl 2 such that the biasing device 40 biases the door panel 20 towards the open position. In certain embodiments, the biasing device 40 is positioned closer to the first end 23a than to the second end 23b of the door panel 20. The method further includes positioning a damper 60 between the door panel 20 and the cowl 2 such that the damper 60 resists rotation of the door panel 20 towards the open position. In certain embodiments, the damper 60 is positioned closer to the second end 23b than to the first end 23a of the door panel 20. In this manner, the inside of the cowl is accessible when the door panel 20 is in the open position and inaccessible when the door panel is in the closed position.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A service door for a cowl for a marine propulsion device, the service door comprising:
    a door panel that is positionable in an open position and in a closed position;
    a first hinge configured for rotatably coupling the door panel to the cowl;
    a biasing device that operates in conjunction with the first hinge and biases the door panel towards the open position;
    a second hinge configured for rotatably coupling the door panel to the cowl, wherein at least one of the first hinge and the second hinge provides only one sheer of rotation between the door panel and the cowl; and
    a damper that operates in conjunction with the second hinge and resists rotation of the door panel towards the open position;
    wherein inside the cowl is accessible when the door panel is in the open position and inaccessible when the door panel is in the closed position;
    wherein the first hinge is rotatable about a first axis, and wherein the biasing device is a coil spring that is coaxially aligned with the first axis, wherein the first hinge comprises a first hinge base, a first hinge axle, and a first hinge axle opening that receives the first hinge axle, wherein the first hinge base is configured for coupling to the cowl, and wherein the first hinge axle opening is in the door panel; and
    wherein the first hinge axle has a base end and a distal end, wherein the base end is coupled to the first hinge base and wherein the distal end has a spring slot, wherein the coil spring has a fixed end and a rotating end that is opposite the fixed end, wherein the rotating end is configured to impart a spring force on the door panel, and wherein the fixed end is in the spring slot.

2. The service door according to claim 1, wherein the biasing device and the damper are each configured to be positioned between the door panel and the cowl.

3. The service door according to claim 1, wherein the first hinge axle extends from the first hinge base such that the only one sheer of rotation is provided between the door panel and the cowl with respect to the first hinge.

4. The service door according to claim 1, wherein the damper comprises a fluid for resisting the rotation of the door panel.

5. The service door according to claim 1, wherein the second hinge comprises a second hinge base from which a second hinge axle extends, and wherein the second hinge comprises a second hinge axle opening that receives the second hinge axle.

6. The service door according to claim 1, further comprising a locking mechanism configured to selectively lock the door panel in the closed position.

7. The service door according to claim 6, wherein the locking mechanism is configured to unlock the door panel when the door panel is manually pressed.

8. The service door according to claim 6, wherein the door panel is configured to automatically open when unlocked.

9. The service door according to claim 1, further comprising a gasket configured to be positioned between the door panel and the cowl to seal between the door panel and the cowl when the door panel is in the closed position.

10. The service door according to claim 1, wherein the door panel has an edge with a first end and a second end that is opposite the first end, and wherein the first hinge rotatably couples the door panel to the cowl at the first end and the second hinge rotatably couples the door panel to the cowl at the second end.

11. The service door according to claim 1, wherein the cowl defines an opening for accessing inside the cowl and the opening has a left edge and a right edge, and wherein the first axis of the first hinge and the second axis of the second hinge are each substantially parallel to the left edge of the opening in the cowl.

12. A service door for a cowl for a marine propulsion device, the service door comprising:
a door panel that is positionable in an open position and in a closed position;
a first hinge configured for rotatably coupling the door panel to the cowl;
a biasing device that operates in conjunction with the first hinge and biases the door panel towards the open position;
a second hinge configured for rotatably coupling the door panel to the cowl, wherein at least one of the first hinge and the second hinge provides only one sheer of rotation between the door panel and the cowl; and
a damper that operates in conjunction with the second hinge and resists rotation of the door panel towards the open position;
wherein inside the cowl is accessible when the door panel is in the open position and inaccessible when the door panel is in the closed position, wherein the second hinge comprises a second hinge base, a second hinge axle, and a second hinge axle opening, wherein the second hinge is rotatable about a second axis that is coaxial with the second hinge axle, and wherein the second hinge base is configured for coupling to the cowl, and wherein the second hinge axle opening is in the door panel; and
wherein the second hinge axle has a base end and a distal end that is opposite the base end, wherein the base end is coupled to the second hinge base and wherein the distal end defines a damper pin opening that is perpendicular to the second hinge axle, further comprising a damper disc that defines a central opening therein and a slot that is perpendicular to the central opening, wherein the second hinge axle is receivable in the central opening in the damper disc, wherein the damper has a fixed end that is configured to engage with the damper disc, wherein the damper has a rotating end that is opposite of the fixed end, and wherein the rotating end of the damper is positioned closer to the base end than to the distal end of the second hinge axle, and further comprising a damper pin that is receivable in the damper pin opening to retain the damper and the damper disc on the second hinge axle.

13. A service door for a cowl for a marine propulsion device, the service door comprising:
a door panel having an edge with a first end and a second end that is opposite the first end, wherein the door panel is positionable in an open position and in a closed position;
a door backer coupled to the door panel;
a first hinge configured for rotatably coupling the first end of the door panel to the cowl, via the door backer, about a first axis, wherein the first hinge comprises a first hinge base, a first hinge axle, and a first hinge axle opening in the door backer, wherein the first hinge axle is coaxial with the first axis, wherein the first hinge axle opening receives the first hinge axle, wherein the first hinge axle has a base end and a distal end that is opposite the base end, wherein the base end is coupled to the first hinge base and wherein the distal end has a spring slot;
a coil spring configured to be positioned between the door panel and the cowl, wherein the coil spring operates in conjunction with the first hinge and biases the door panel towards the open position, wherein the coil spring has a fixed end and a rotating end that is opposite the fixed end, wherein the rotating end is configured to impart a spring force on the door panel, and wherein the fixed end is in the spring slot in the first hinge axle;
a second hinge configured for rotatably coupling the second end of the door panel to the cowl, via the door backer, about a second axis, wherein the second hinge comprises a second hinge base, a second hinge axle, and a second hinge axle opening in the door backer, wherein the second hinge axle is coaxial with the second axis, wherein the second hinge axle opening receives the second hinge axle, wherein the second hinge axle has a base end and a distal end that is opposite the base end, wherein the base end is coupled to the second hinge base and wherein the distal end defines a damper pin opening that is perpendicular to the second hinge axle, wherein the first hinge and the second hinge are rotatable about separate but coaxial axes, wherein the first hinge and the second hinge each have only one sheer of rotation between the door panel and the cowl;
a damper configured to be positioned between the door panel and the cowl, wherein the damper operates in conjunction with the second hinge and resists rotation of the door panel towards the open position;
a damper disc that defines a central opening and also defines a slot that is perpendicular to the central opening, wherein the central opening in the damper disc is configured to receive the second hinge axle, wherein the damper has a fixed end that is configured to engage with the damper disc and wherein the damper has a rotating end that is opposite of the fixed end, and wherein the rotating end of the damper is positioned closer to the base end than to the distal end of the second hinge axle; and a damper pin that is receivable in the damper pin opening to retain the damper and the damper disc on the second hinge axle;

wherein inside the cowl is accessible when the door panel is in the open position and inaccessible when the door panel is in the closed position.

14. A method for providing access inside a cowl for a marine propulsion device, the method comprising:

rotatably coupling a door panel to the cowl with a first hinge, the first hinge comprising a first hinge base configured for coupling to the cowl, a first hinge axle defining a first axis about which the door panel pivots, and a first hinge axle opening in the door panel, wherein the first hinge axle opening receives the first hinge axle, the door panel having an edge with a first end and a second end that is opposite the first end, the first hinge being coupled between the door panel and the cowl closer to the first end than to the second end, the door panel being positionable in an open position and in a closed position, wherein the first hinge axle has a base end and a distal end, wherein the base end is coupled to the first hinge base and wherein the distal end has a spring slot;

rotatably coupling the door panel to the cowl with a second hinge, the second hinge comprising a second hinge axle defining a second axis about which the door panel pivots, the second hinge being coupled between the door panel and the cowl closer to the second end than to the first end, the first hinge axle and the second hinge axle being positioned apart with the first axis and the second axis being coaxially aligned, and the first hinge and the second hinge each having only one sheer of rotation between the door panel and the cowl;

positioning a spring between the door panel and the cowl, wherein the spring is a coil spring that is coaxially aligned with the first axis and operates in conjunction with the first hinge such that the spring biases the door panel towards the open position, the spring being positioned closer to the first end than to the second end of the door panel, wherein the coil spring has a fixed end and a rotating end that is opposite the fixed end, wherein the rotating end is configured to impart a spring force on the door panel, and wherein the fixed end is in the spring slot; and positioning a damper between the door panel and the cowl, wherein the damper operates in conjunction with the second hinge such that the damper resists rotation of the door panel towards the open position, the damper being positioned closer to the second end than to the first end of the door panel;

wherein inside the cowl is accessible when the door panel is in the open position and inaccessible when the door panel is in the closed position.

* * * * *